United States Patent
Im et al.

(10) Patent No.: US 7,353,050 B2
(45) Date of Patent: Apr. 1, 2008

(54) PORTABLE DIGITAL COMMUNICATION APPARATUS WITH REVERSIBLE DUAL-AXIS HINGE

(75) Inventors: Jung-Hyeok Im, Seongnam-si (KR); Chang-Soo Lee, Incheon (KR); In-Gon Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 456 days.

(21) Appl. No.: 11/020,846

(22) Filed: Dec. 23, 2004

(65) Prior Publication Data

US 2005/0186985 A1 Aug. 25, 2005

(30) Foreign Application Priority Data

Feb. 20, 2004 (KR) .................. 10-2004-0011311

(51) Int. Cl.
*H04M 1/00* (2006.01)
(52) U.S. Cl. .................. 455/575.3; 455/575.1; 455/550.1; 455/575.4; 379/433.12; 379/433.13
(58) Field of Classification Search ............ 455/575.3, 455/575.4, 550.1, 90.3, 348, 575.1, 349, 455/350, 347, 344, 346, 425, 456.6, 128, 455/566, 575.8, 557; 379/428.01, 428.04, 379/433.12, 433.13, 440, 447, 433.11; 348/207.99, 348/14.02, 375, 376, 368, 373, 333.06, 333.07; 361/683, 681; 16/330, 221
See application file for complete search history.

(56) References Cited

U.S. PATENT DOCUMENTS

| | | | |
|---|---|---|---|
| 5,844,543 A * | 12/1998 | Tamura et al. .............. 345/156 |
| 6,119,019 A * | 9/2000 | Phelps ...................... 455/575.3 |
| 6,266,236 B1 * | 7/2001 | Ku et al. .................... 361/681 |
| 6,791,597 B2 * | 9/2004 | Ando et al. .............. 348/14.02 |
| 6,831,229 B1 * | 12/2004 | Maatta et al. .................. 174/66 |
| 6,900,981 B2 * | 5/2005 | Kuivas et al. .............. 361/683 |
| 7,072,699 B2 * | 7/2006 | Eiden ...................... 455/575.8 |
| 7,228,158 B2 * | 6/2007 | Lee et al. ................. 455/575.3 |
| 2004/0137958 A1 * | 7/2004 | Sawai ......................... 455/566 |
| 2005/0026656 A1 * | 2/2005 | Park et al. ................... 455/557 |
| 2005/0042006 A1 * | 2/2005 | Qian et al. ................... 399/380 |
| 2005/0083642 A1 * | 4/2005 | Seripuku et al. ............ 361/681 |
| 2005/0099533 A1 * | 5/2005 | Matsuda et al. ............ 348/375 |
| 2005/0124394 A1 * | 6/2005 | Kim et al. ................ 455/575.3 |
| 2005/0128695 A1 * | 6/2005 | Han .......................... 361/683 |
| 2005/0219372 A1 * | 10/2005 | Watanabe .............. 348/207.99 |
| 2005/0236869 A1 * | 10/2005 | Ka et al. ..................... 296/192 |
| 2005/0272462 A1 * | 12/2005 | Okamoto ................. 455/550.1 |

(Continued)

*Primary Examiner*—Edward F. Urban
*Assistant Examiner*—Charles Chow
(74) *Attorney, Agent, or Firm*—The Farrell Law Firm, PC

(57) ABSTRACT

A portable digital communication apparatus including a first housing extending along a longitudinal direction; a second housing which is shorter than the first housing and which is adapted to be opened away from or closed on the first housing through sliding and rotation motions; and a dual-axis hinge device connecting the first and second housings to allow them to be rotated about a first hinge axis, which is provided in the first housing, and a second hinge axis, which is provided in the second housing and which is parallel to the first hinge axis, respectively, the dual-axis hinge device being adapted to be rotated to allow the upper and lower surfaces thereof can be reversed according to the sliding motion of the second housing.

8 Claims, 5 Drawing Sheets

U.S. PATENT DOCUMENTS

2006/0137141 A1* 6/2006 Kuramochi ............... 16/330
2006/0179612 A1* 8/2006 Oshima et al. ........... 16/330
2006/0197861 A1* 9/2006 Won et al. ............ 348/333.06
2006/0211457 A1* 9/2006 Otsuka .................. 455/575.1

* cited by examiner

PORTABLE DIGITAL COMMUNICATION APPARATUS WITH REVERSIBLE DUAL-AXIS HINGE

PRIORITY

This application claims priority to an application entitled "Portable Digital Communication Apparatus" filed with the Korean Intellectual Property Feb. 20, 2004 and assigned Ser. No. 2004-11311, the contents of which are hereby incorporated by reference.

BACKGROUND OF THE INVENTION

1. Field of the Invention

The present invention relates to portable communication apparatuses, such as cellular phones, PDAs (personal digital assistants), HHPs (hand held phones), and PCS (personal communication service) phones, and more particularly to a portable digital communication apparatus adapted to be opened/closed through sliding and rotation motions to rotate a camera lens.

2. Description of the Related Art

In general, a "portable communication apparatus" refers to an electronic apparatus which a user can carry with him to perform wireless communication with a desired partner. Conventional portable communication apparatuses necessarily have an antenna device, a data input/output device, a transceiver unit, and the like. For the sake of portability, designs of such portable communication apparatuses tend to be compact, slim, and light. Multimedia availability is also a consideration, where having a wider variety of functions is desirable.

In particular, future portable communication apparatuses are expected to incorporate greater multi-functionality and multi-purpose utilization, as well as being more compact and lighter, while capable of various multimedia environments or Internet environments. Additionally, such portable communication apparatuses are now commonly used throughout the world, and are recognized by some people as a nearly indispensable commodity which must always be carried.

Conventional portable communication apparatuses may be classified into various types according to their appearance, such as bar-type portable communication apparatuses, flip-type portable communication apparatuses, and folder-type portable communication apparatuses. The bar-type portable communication apparatus has a single housing shaped like a bar. The flip-type portable communication apparatus has a flip which is pivotably mounted to a bar-shaped housing by a hinge device. The folder-type portable communication apparatus has a folder coupled to a single bar-shaped housing by a hinge device to allow the folder to be rotated in order to be folded towards or unfolded away from the housing.

Further, portable communication apparatuses may be classified into neck-wearable type communication apparatuses and wrist-wearable type communication apparatuses according to the position at or the way in which a user puts on the communication apparatus. The neck wearable type communication apparatus is one which a user wears around the neck using a string, while the wrist wearable type communication apparatus is one which a user wears around the wrist.

Additionally, portable communication apparatuses may be classified into rotation-type communication apparatuses and sliding-type communication apparatuses depending on the particular way the communication apparatus is opened. In the rotation-type portable communication apparatus, two housings are coupled to each other in such a manner that one housing rotates open or closed relative to the other while facing each other. In the sliding-type portable communication apparatus, two housings are coupled to each other in a manner so that one housing slides along a longitudinal direction so as to be opened or closed relative to the other. These variously classified portable communication apparatuses can be easily understood by those skilled in the art.

Meanwhile, conventional portable communication apparatuses now tend to have the capability of transmitting data at a high speed in addition to the basic function of performing voice communication. In other words, according to increased demand by consumers, portable communication apparatuses now tend to provide service using wireless communication technology capable of transmitting data at a high speed.

Recent portable communication apparatuses tend to be equipped with a camera lens enabling it to transmit an image signal. That is, current conventional portable communication apparatuses may have an external or imbedded camera lens module which enables a user to make an image communication with a desired partner or to take a photograph of a desired subject.

However, in many cases it is inconvenient to use the external or imbedded camera lens module employed by conventional portable communication apparatuses. The external camera lens module must always be carried separately from the portable communication apparatus. It is therefore possible to lose the module or fail to have it when necessary. The imbedded camera lens module also has a problem in that its camera lens is fixed, and therefore users must assume an inconvenient posture when taking a photograph of a subject or when making an image communication with a partner.

SUMMARY OF THE INVENTION

Accordingly, the present invention has been made to solve the above-mentioned problems occurring in the prior art, and an object of the present invention is to provide a portable digital communication apparatus which is convenient to use.

Another object of the present invention is to provide a portable digital communication apparatus having a camera lens and a speaker device which are positioned in a housing to allow them to be rotated open or closed for maximum convenience of use.

Still another object of the present invention is to provide a portable digital communication apparatus having a camera lens adapted to be rotated and directed as a user positions his finger in a groove of a second housing and pushes it to open/close it.

In order to accomplish these objects, there is provided a portable digital communication apparatus including a first housing extending along a longitudinal direction; a second housing which is shorter than the first housing and which is adapted to be opened away from or closed onto the first housing through sliding and rotation motions; and a dual-axis hinge device connecting the first and second housings to allow them to be rotated about a first hinge axis, which is provided in the first housing, and a second hinge axis, which is provided in the second housing and which is parallel to the first hinge axis, respectively, the dual-axis hinge device being adapted to be rotated to allow the upper and lower surfaces thereof can be reversed according to the sliding motion of the second housing.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
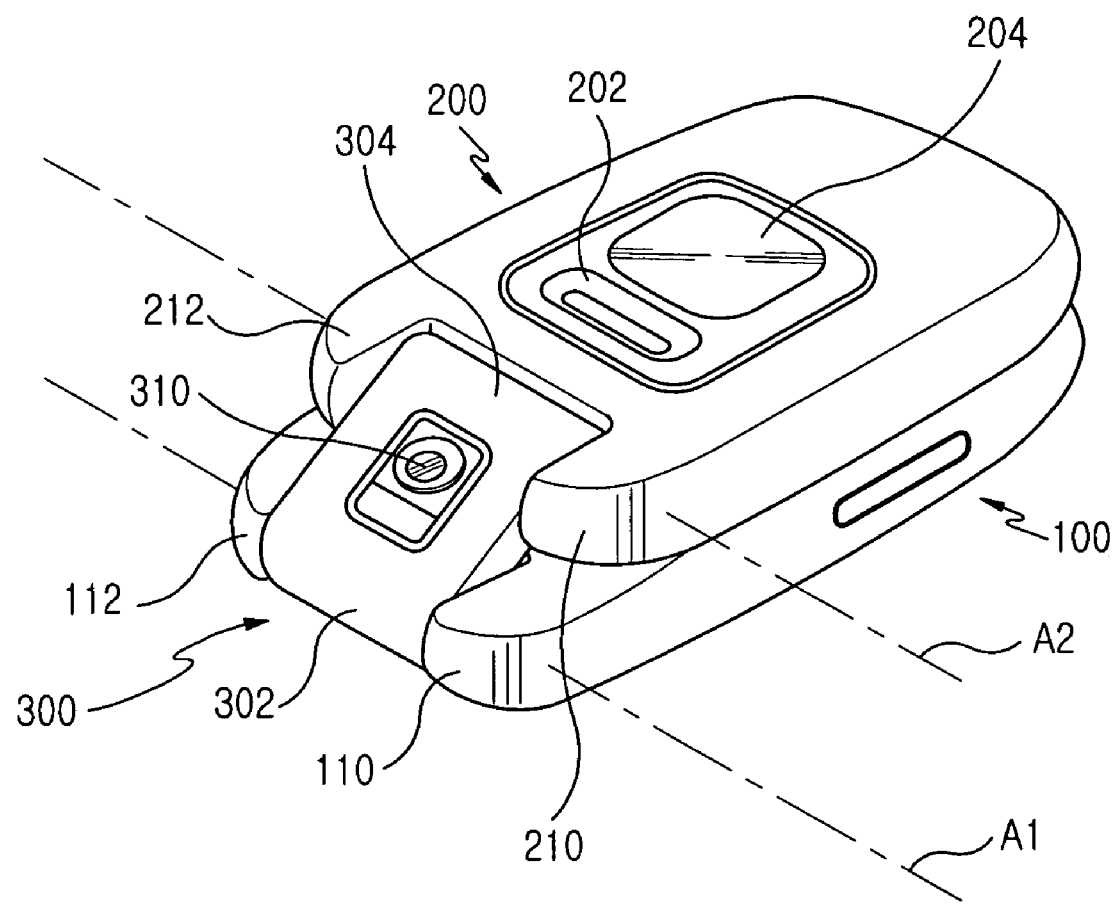
FIG. 1 is a perspective view showing a portable digital communication apparatus according to a preferred embodiment of the present invention.

Hereinafter, preferred embodiments of the present invention will be described with reference to the accompanying drawings. In the following description of the preferred embodiment of the present invention, a detailed description of known functions and configurations incorporated herein will be omitted when it may make the subject matter of the present invention unclear. In the drawings, the same or similar reference numbers will be used throughout the drawing to refer to the same or like parts.

As shown in FIGS. 1 to 4, a portable digital communication apparatus according to the present invention is provided with a first housing 100 having a bar shape, i.e., extending along a longitudinal direction; a bar-shaped second housing 200 which preferably is shorter than the first housing 100 and which is adapted to be opened away from or closed onto the first housing 100 through sliding and rotation motions; and a dual-axis hinge device 300 which rotatably connects the first and second housing 100 and 200 to each other and which is adapted to be rotated, according to whether the sliding motion is made or not, to allow the upper or lower surface thereof to be reversed. In particular, the dual-axis hinge device 300 has an end 302 rotatably connected to the first housing 100 to provide a first hinge axis A1 and the other end 304 rotatably connected to the second housing 200 to provide a second hinge axis A2. The first and second hinge axes A1 and A2 are parallel to each other.

When the second housing 200 is completely closed on the first housing 100, the dual-axis hinge device 300 has its ends 302 and 304 aligned on the first and second housing 100 and 200, respectively, and remain slanted, as shown in FIG. 1, due to the difference in length between the two housings.

Figure 3:
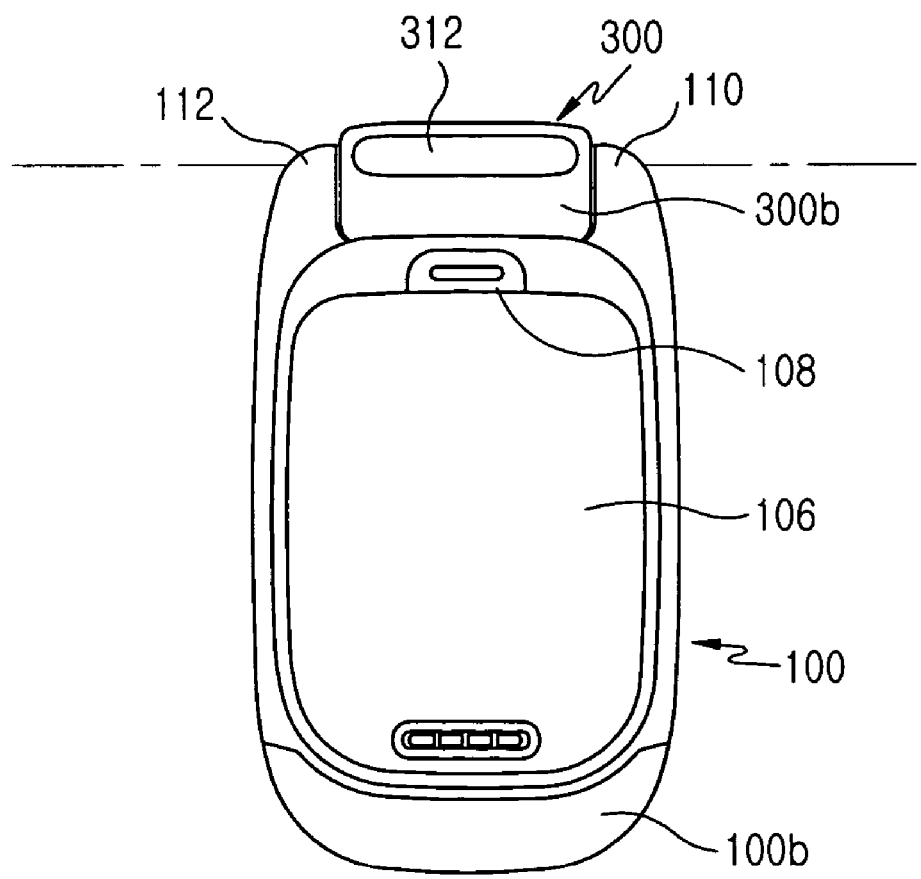
FIG. 3 is a rear view of the apparatus shown in FIG. 1.
Figure 4:
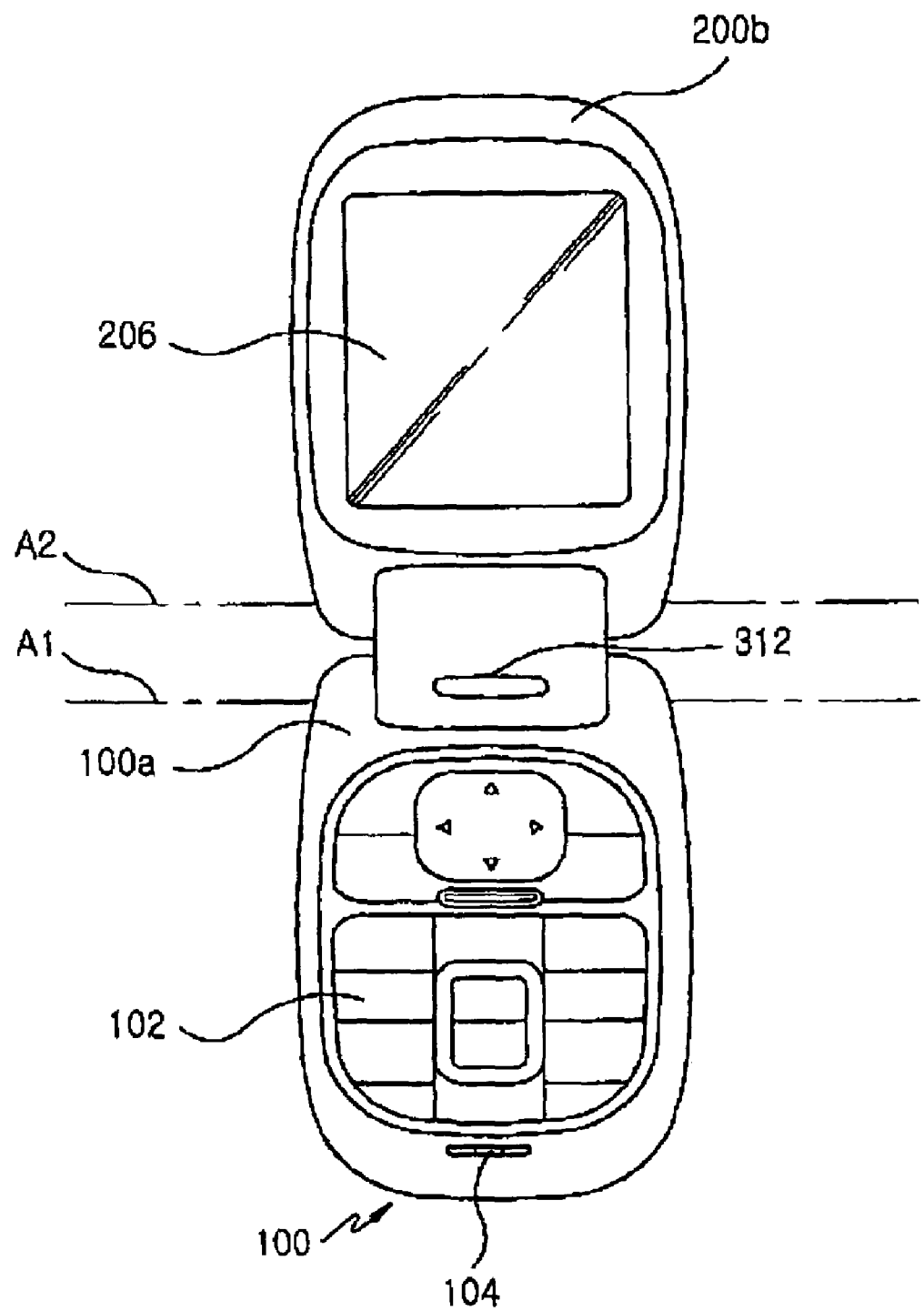
FIG. 4 is a front view showing a portable digital communication apparatus according to a preferred embodiment of the present invention wherein the apparatus is opened.

Referring to FIG. 4, the first housing 100 has a key array 102 which is composed of a number of keys and which is positioned on the upper surface 100a thereof; a microphone device 104 positioned adjacently to the key array 102; a battery pack 106 (FIG. 3) which is positioned on the lower surface 100b thereof and which is fastened/unfastened by a locking knob 108; and a pair of first hinge arms 110 and 112 (FIG. 1) which are formed on the upper end thereof and which are adapted to be coupled to the end 302 of the dual-axis hinge device.

The second housing is provided with, on its upper surface 200a, a groove 202 for facilitating the sliding motion and an auxiliary display device 204 and is provided with, on its lower surface 200b, a main display device 206 (FIG. 4). A locking button is positioned in the groove 202. The second housing also has a pair of second hinge arms 210 and 212 formed on its upper end, which are coupled to the other end 304 of the dual-axis hinge device 300. The main and auxiliary display devices 206 and 204 are preferably made of liquid display devices. The auxiliary display device 204 may display an icon showing the antenna reception sensitivity, an icon showing the battery charge level, time, date, the telephone number calling when receiving a call, and the like. The main display device 206 preferably displays data regarding message transmission, and the like. Preferably, the first and second hinge arms 110, 112, 210 and 212 are arranged symmetrically.

Figure 2:
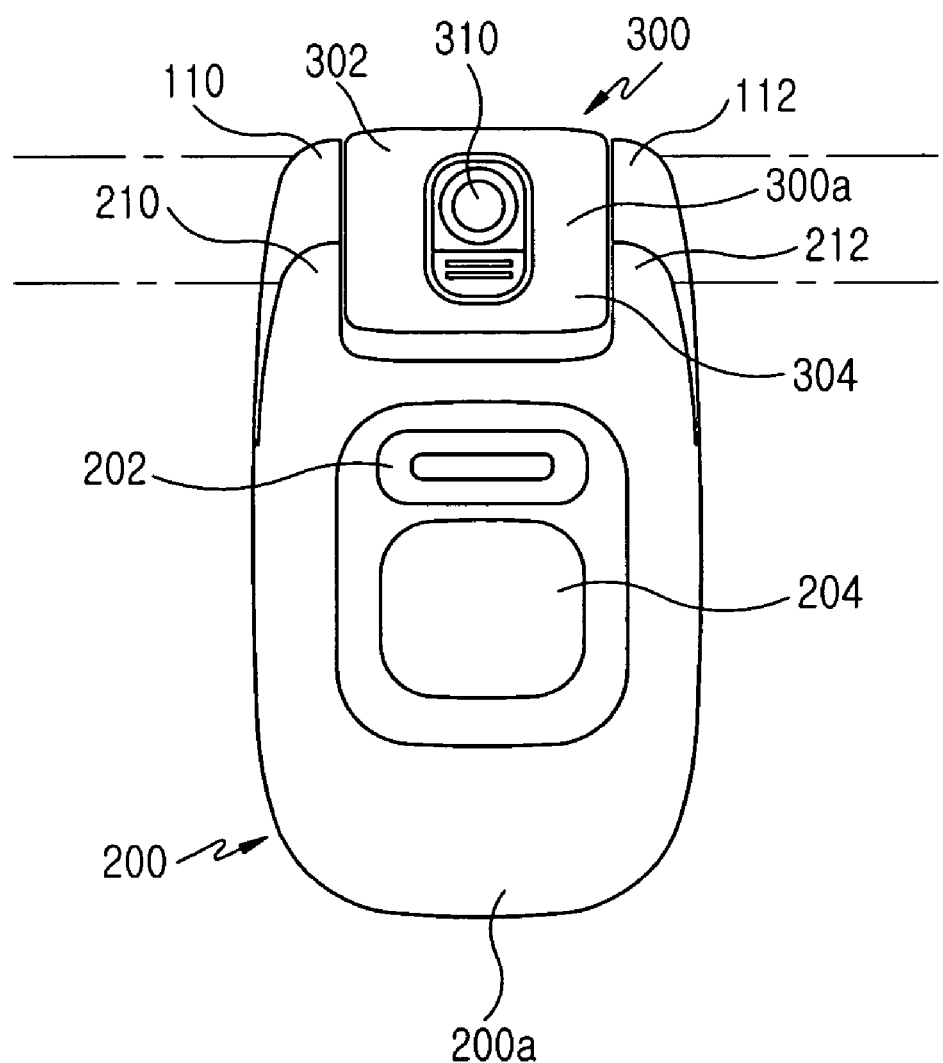
FIG. 2 is a front view of the apparatus shown in FIG. 1.

The dual-axis hinge device 300 is provided with a camera lens module 310 on its upper surface 300a and a speaker device 312 on its lower surface 300b. When the second housing 200 is completely closed on the first housing 100, the camera lens module 310 is directed toward the upper surface 100a of the first housing and the speaker device 312 toward the lower surface 100b thereof, as shown in FIGS. 2 and 3, respectively.

When the second housing 200 is completely opened from the first housing 100, as shown in FIG. 4, the speaker device 312 is positioned adjacent to the key array 102.

Figure 5A:
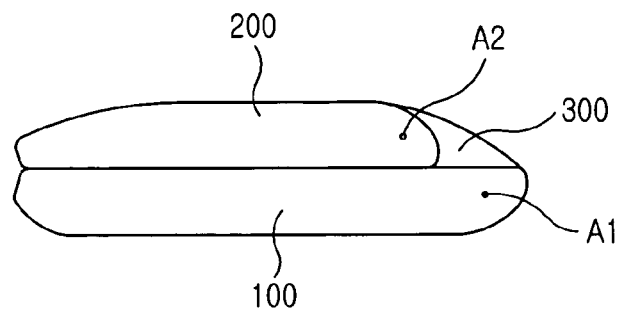
FIGS. 5a to 5c are side views showing a procedure for opening a portable digital communication apparatus according to a preferred embodiment of the present invention.
Figure 5B:
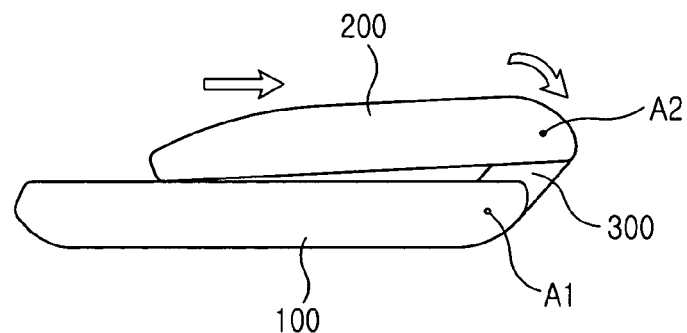
Figure 5C:
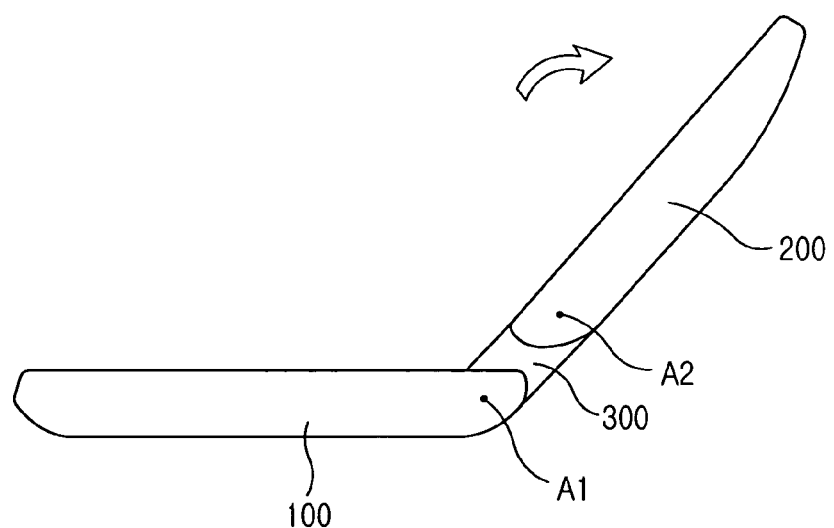

The following procedures for opening/closing the portable digital communication apparatus according to the present invention will now be described with reference to FIGS. 5A to 5C. A user places his finger in the groove 202, which is formed on the upper surface 100a of the second housing, in a state as shown in FIG. 5A and pushes it along a direction indicated by the arrow of FIG. 5B. The second housing 200 is then slid into a state as shown in FIG. 5B, while the dual-axis hinge device 300 is rotated. Subsequently, the user opens the second housing 200 into a state as shown in FIG. 5C. As such, the second housing 200 is opened away from or closed towards the first housing 100 through double motions, i.e., through sliding and rotation motions, by means of rotation of the dual-axis hinge device. Preferably, the dual-axis hinge device 300 is reversed concurrently with the opening/closing so that the camera lens module and the speaker device can be directed as desired, i.e., either toward the upper surface 100a of the first housing or toward the lower surface 100b thereof.

The dual-axis hinge device 300 has two hinge modules (not shown) positioned therein, which provide the first and second hinge axes A1 and A2 and which supply mechanical power necessary for opening/closing the second housing 200.

As mentioned above, the portable digital communication apparatus according to the present invention is advantageous in that the camera lens or the speaker device can be rotated and reversed as the apparatus is opened or closed, so that they can be directed as desired for convenient use.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A portable digital communication apparatus comprising:

a first housing extending along a longitudinal direction of the apparatus and having a first upper surface and a first lower surface opposite the first upper surface;

a second housing which is shorter than the first housing in the longitudinal direction and which is adapted to open away from and close onto the first housing through sliding and rotational motions, the second housing having a second upper surface and a second lower surface opposite the second upper surface, the second lower surface facing the first upper surface when the apparatus is in a closed state in which the second housing is closed onto the first housing; and a dual-axis hinge device having a hinge upper surface, a hinge lower surface opposite the hinge upper surface, a first hinge axis for rotatably connecting the hinge device and the first housing, and a second hinge axis parallel with the first hinge axis and for rotatably connecting the hinge device and the second housing, the dual-axis hinge device being adapted to rotate to allow the hinge upper and hinge lower surfaces to be reversed in orientation facilitated by the sliding motion of the second housing.

2. A portable digital communication apparatus as claimed in claim 1, wherein the dual-axis hinge device has an end rotatably connected to the first housing and the other end rotatably connected to the second housing.

3. A portable digital communication apparatus as claimed in claim 1, wherein the dual-axis hinge device is positioned at an angle with respect to the longitudinal direction when the second housing is closed onto the first housing.

4. A portable digital communication apparatus as claimed in claim 1, wherein the dual hinge device is provided with a camera lens module on the hinge upper surface and a speaker device on the hinge lower surface.

5. A portable digital communication apparatus as claimed in claim 1, wherein the second housing has a groove formed on the second upper surface for facilitating the sliding motion.

6. A portable digital communication apparatus as claimed in claim 1, wherein the first housing has a pair of first hinge arms to be connected to the dual-axis hinge device, the second housing has a pair of second hinge arms to be connected to the dual-axis hinge device, and the first and second hinge arms are positioned symmetrically with respect to each other.

7. A portable digital communication apparatus as claimed in claim 4, wherein, in the closed state, the camera lens module is oriented in a common direction as the first upper surface and the speaker device is oriented in a common direction as the first lower surface, and when the second housing is opened away from the first housing, the camera lens module is oriented in a common direction as the first lower surface and the speaker device is oriented in a common direction as the first upper surface.

8. A portable digital communication apparatus comprising:

a first housing defined substantially in a longitudinal axis of the apparatus;

a second housing provided on a first upper surface of the first housing in a closed position which the second housing is closed on the first housing; and a hinge device having a pair of hinge modules defining parallel hinge axes including a first hinge axis and a second hinge axis and both the hinge axes are perpendicular to the longitudinal axis, the first hinge axis for rotatably connecting the first housing and the hinge device, the second hinge axis for rotatably connecting the second housing and the hinge device, wherein the hinge device facilitates sliding movement of the first and second housings relative to one another along the longitudinal axis and also rotational movement with respect to one another about the hinge modules when the second housing opens away from and closes onto the first housing.

* * * * *